United States Patent
Egan

[11] Patent Number: 4,895,610
[45] Date of Patent: Jan. 23, 1990

[54] SELF-SEALING PNEUMATIC TIRE AND METHOD OF MANUFACTURING THE SAME

[75] Inventor: William E. Egan, Tallmadge, Ohio

[73] Assignee: The Goodyear Tire & Rubber Company, Akron, Ohio

[21] Appl. No.: 202,171

[22] Filed: Jun. 3, 1988

Related U.S. Application Data

[63] Continuation-in-part of Ser. No. 905,362, Sep. 9, 1986, abandoned, which is a continuation of Ser. No. 690,920, Jan. 11, 1985, abandoned, which is a continuation of Ser. No. 523,495, Aug. 15, 1983, abandoned.

[51] Int. Cl.⁴ .................. B60C 21/08; B32B 31/00
[52] U.S. Cl. .................. 156/115; 156/275.5; 152/507; 428/912; 523/166
[58] Field of Search .................. 156/115, 275.5; 152/502, 503, 516, 450, 506, 507; 523/166; 106/33; 428/912

[56] References Cited

U.S. PATENT DOCUMENTS

| | | | |
|---|---|---|---|
| 2,765,018 | 10/1956 | Connell | 156/115 X |
| 3,048,509 | 8/1962 | Sweet et al. | 152/504 |
| 3,565,151 | 2/1971 | Courtney | 152/505 |
| 3,935,893 | 2/1976 | Stang et al. | 152/504 |
| 4,064,922 | 12/1977 | Farber | 152/504 |
| 4,171,237 | 10/1979 | Bohm et al. | 156/115 |
| 4,228,839 | 10/1980 | Bohm et al. | 156/115 |
| 4,282,052 | 8/1981 | Dobson | 156/115 |

FOREIGN PATENT DOCUMENTS

| | | | |
|---|---|---|---|
| 1083288 | 8/1980 | Canada | 152/504 |
| 1080844 | 12/1954 | France | |
| 0055802 | 5/1978 | Japan | 156/115 |

Primary Examiner—David Simmons
Assistant Examiner—Gregory J. Wilber
Attorney, Agent, or Firm—Alvin T. Rockhill

[57] ABSTRACT

This invention relates to a pneumatic tire with puncture sealing properties and a method for manufacturing such a tire. In this method of manufacturing such a self-sealing pneumatic rubber tire a polymer composition layer is built into the tire in a relatively conventional manner. Under the conditions of heat and pressure used to cure the tire this polymer composition is both crosslinked and depolymerized to form a tacky material which has puncture sealant properties (the sealant layer). Ordinary tire manufacturing techniques can be employed since the sealant layer has the physical properties of ordinary butyl rubber used in tire building at the time it is assembled into the tire.

7 Claims, 1 Drawing Sheet

SELF-SEALING PNEUMATIC TIRE AND METHOD OF MANUFACTURING THE SAME

This is a continuation-in-part of application Ser. No. 06/905,362, filed on Sep. 9, 1986, (now abandoned) which was a continuation of Application Ser. No. 06/690,920, filed on Jan. 11, 1985, (now abandoned) which was a continuation of Application Ser. No. 06/523,495, filed on Aug. 15, 1983 (now abandoned).

TECHNICAL FIELD

This invention relates to a pneumatic tire with puncture sealing properties and a method for manufacturing such a tire. This invention more particularly relates to a pneumatic rubber tire of the tubeless type having a puncture sealing feature.

BACKGROUND OF THE INVENTION

The concept of a pneumatic tire with puncture sealing properties is old and many attempts to obtain a satisfactory puncture sealing pneumatic tire have been made. Historically such attempts have entailed modifying pneumatic tires in such a way so as to retard or prevent a loss of air and consequential deflation of the tire after being punctured with a sharp object, such as a nail.

Examples of such teachings date back to the early 1900's wherein relatively simple disclosures were made to provide a tire with a strip of unvulcanized rubber which, it is stated, would have puncture sealing properties. More recent teachings relate to more sophisticated tire constructions, sealant compositions and methods wherein a sealant material is encased or encapsulated in between calendered layers (see U.S. Pat. Nos. 3,048,509, and 4,228,839).

Many additional methods, sealants and tire constructions have been suggested for puncture sealant pneumatic tires. However, all of these ideas have had certain drawbacks. For example, the use of fluid puncture sealant coatings which seal by flowing into the puncture hole has sometimes been unsuccessful primarily because sealant coatings may flow excessively and thus tend to cause the tire to become out of balance. Also, many times such a sealant coating is not operable or effective over a wide temperature range extending from summer to winter conditions. Central cores of cellular material which will physically maintain the shape of the tire when punctured can place a restriction on the maximum speed of a vehicle on which they are used because of potential breakdown or destruction of the cells caused by the effects of heat and distortion. More complicated structures wherein the sealant material is encased in a vulcanized material are usually expensive to manufacture and can also create balance and suspension problems due to the additional weight required in the tire.

Puncture sealing tires have been built wherein a layer of degraded rubber which is tacky or gummy (of low viscosity) is assembled into the unvulcanized tire. This method of construction is usually only reasonably possible when the degraded layer of rubber is laminated with another ungraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more undegraded rubber layers it is capable of retaining its structural integrity during the vulcanization operation wherein high pressures are applied to the tire which would displace the degraded rubber layer from its desired location if not laminated. Such a lamination procedure adds greatly to the cost of building a tire. Thus, such a lamination procedure has not been widely accepted on a commercial basis for building puncture sealing pneumatic tires. There has been a continuing desire for a pneumatic tire having an effective puncture sealing feature and for a simple and practical method of preparing such a tire.

This invention provides a method for building a tire with puncture sealing features by degrading a built-in rubber layer (polymer composition) in a special manner during the vulcanization of the tire. Therefore, during the tire building procedure the polymer composition layer (which will be the sealant layer after the tire is cured) is of high viscosity and can be easily handled.

SUMMARY OF THE INVENTION

The method of this invention provides a simplified, inexpensive process for manufacturing self-sealing pneumatic rubber tires with puncture sealant properties. In the tire building method of this invention a layer of butyl rubber containing at least one peroxide vulcanizing agent (polymer composition) that will both depolymerize and crosslink at the temperatures used to cure (vulcanize) the tire is assembled into an unvulcanized tire. In effect, the butyl rubber in the polymer composition is partially crosslinked to provide a degree of dimensional stability and degraded to a low viscosity to form a tacky material which has puncture sealing properties. In the method of this invention, this polymer composition is assembled into the unvulcanized rubber tire and the tire is vulcanized using standard known methods which convert the polymer composition into a sealant layer.

This invention discloses a method of manufacturing a pneumatic rubber tire having an outer circumferential tread, a supporting carcass therefore, and an inner liner disposed inwardly from said supporting carcass, containing a puncture sealant layer which is formed in situ, the steps of which comprise:

(1) providing a polymer composition comprised of at least one butyl rubber and at least one peroxide vulcanizing agent:

(2) assembling said polymer composition as a layer into an unvulcanized rubber tire inwardly from said supporting carcass and outwardly from said innerliner during the tire building process; and (3) shaping and curing said rubber tire under conditions of heat and pressure sufficient to both crosslink and partially depolymerize said butyl rubber in said polymer composition layer.

The polymer composition also contains polyisobutylene. The polymer composition is more specifically comprised of 100 parts by weight butyl rubber, 5 to 35 parts by weight polyisobutylene, and 1 to 8 parts by weight of a peroxide vulcanizing agent. The polyisobutylene is characterized by having a number average molecular weight as determined by osmometry in the range of about 7,500 to 15,000.

This invention further reveals an improved pneumatic tire comprising an outer circumferential tread, a supporting carcass therefore and an inner rubber liner disposed inwardly from said supporting carcass, and a puncture sealant layer which is disposed inwardly from said supporting carcass and outwardly from said innerliner wherein said puncture sealant layer consists essentially of a partially depolymerized butyl rubber vulcanizate.

DETAILED DESCRIPTION OF THE INVENTION

In the method of this invention a polymer composition layer is assembled into an unvulcanized rubber tire using conventional tire building techniques. After an unvulcanized tire is built including such a polymer composition layer the tire is vulcanized employing standard methods. Such a polymer composition layer is assembled into the tire inwardly from the tires supporting carcass and outwardly from an innerliner layer (which can be an air barrier layer) in the unvulcanized tire. Such a polymer composition layer can be sandwiched between two or more layers of innerliner or between one or more innerliner layers and the tire carcass.

The physical nature of the polymer composition layer is that its viscosity is high enough to permit easy handling during the standard steps in the construction of an unvulcanized tire and during the vulcanization (curing) operation: that is, the polymer composition layer has enough uncured strength (modulus) to retain its shape during building, enough tack to stick to adjacent layers during building and enough strength to retain its shape during the application of the high pressure during vulcanization. It also is not too tacky and does not stick to undesired materials, like the building drum.

As the tire is vulcanized with the polymer composition layer in situ, the polymer composition layer is partially depolymerized (degraded) and crosslinked. In effect, the butyl rubber in the polymer composition layer is degraded to a low viscosity to form a tacky material which has puncture sealing properties. Thus, the polymer composition layer is transformed into a puncture sealant layer during the curing of the tire. This partial depolymerization and crosslinking of the polymer composition layer is effectuated by the presence of one or more peroxide vulcanizing agents in the polymer composition. Although the presence of such peroxides in polyisoprene results in only a slight degree of depolymerization, such depolymerization reactions are very pronounced in polyisobutylene and butyl rubbers.

It is an interesting feature of this invention, in that so far as it is understood, that the butyl rubber in the polymer composition is essentially simultaneously crosslinked to form a network structure while it is also depolymerized to a lower viscosity. Thus, it is believed that during this depolymerization that relatively few, if any, isoprene linkages are broken down while the isobutylene portion of the molecule is being depolymerized to a tacky state. It is considered that a most important effect of this chemical action is to provide a structure with sufficient dimensional stability to contain this lower viscosity tacky material.

Butyl rubber is produced by copolymerizing isobutylene with small amounts of isoprene. Generally, butyl rubber contains from about one to five percent repeat units derived from isoprene and from about 95 to 99 percent repeat units derived from isobutylene by weight. The butyl rubber that can be employed in the polymer composition of the tires of this invention has a number average molecular weight in the range of 200,000 to 500,000 and preferably in the range of about 300,000 to about 400,000.

Blends of various butyl rubbers can also be employed in the polymer composition layer used in the tires of this invention. As a matter of fact, the polymer composition employed in the practice of this invention is a blend of polyisobutylene and butyl rubber. This preferred butyl rubber blend will generally contain from about 5 to about 35 parts by weight polyisobutylene per hundred parts of the butyl rubber which is a copolymer of isobutylene and isoprene. It is generally more preferred for about 10 parts by weight of polyisobutylene to be employed prior 100 parts of the butyl rubber copolymer used in the polymer composition blend. The polyisobutylene used in the practice of this invention is generally a semi-solid over a broad temperature range, such as, from about 20° C. to 40° C. Such semi-solid polyisobutylene generally has an average number average molecular weight in the range of 7500 to 15,000. Its viscosity s generally in the range of about 50 to about 4500 and preferable in the range of about 400 to about 4300 centistokes at 99° C. (210° F.). It is preferred for the butyl rubber blends employed in this invention to have a low Mooney viscosity ranging from about 40 to about 58.

It is preferable for the polymer composition layer assembled into the tires of this invention to have the following composition by weight:
100 parts of a butyl rubber copolymer,
about 10 to 40 parts of carbon black,
about 5 to 35 parts of polyisobutylene,
about 5 to 35 parts of an oil extender,
about 0 to 1 part of sulfur, and
from about 1 to 8 parts of a peroxide vulcanizing agent.

A more preferred composition for the polymer composition layer will include:
100 parts of a butyl rubber copolymer,
20 to 30 parts of carbon black,
8 to 12 parts of polyisobutylene,
8 to 12 parts of an oil extender,
0.1 to 0.4 parts of sulfur, and
about 2 to 4 parts of a peroxide vulcanizing agent.

It is to be understood that other known fillers and/or reinforcing agents, such as silica and calcium carbonate, can be substituted for part of the carbon black in this composition. Any oil extender or rubber process oil can be employed in this composition. Castor oil is a preferred oil extender for use in the polymer composition layer. Castor oil is a triglyceride of fatty acids. Its fatty acid composition is approximately 87 percent ricinoleic acid, 7 percent oleic acid, 3 percent linoleic acid, 2 percent palmitic acid, and 1 percent stearic acid. Any peroxide vulcanizing agent for rubber can be employed in the polymer composition layer.

The peroxide compounds utilized are those generally used for the crosslinkage of polymers. Preferably peroxide compounds are employed which only disintegrate at high temperatures, that is, above about 100° C. (212° F.). Examples of such peroxides are tert.butyl perbenzoate and dialkyl peroxides with the same or different radicals, such as dialkylbenzene peroxides and alkyl peresters. Preferably the peroxide vulcanizing agent employed will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such peroxide vulcanizing agents include: 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide;

2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. Such peroxide vulcanizing agents can be added to the polymer composition layer in pure form (100 percent active peroxide) or on an inert, free-flowing mineral carrier. Silicon oil is an inert mineral carrier often utilized for this purpose. Such carrier composition containing from about 35 to 60 weight percent active ingredient (peroxide) can be employed very successfully. For example, 40 percent by weight dicumylperoxide on an inert carrier can be employed as the peroxide vulcanizing agent in the polymer composition layer with good results.

Known stabilizing agents that are used in rubber compounds can be utilized in the polymer composition layer of this invention. The amount of the stabilizing agent in the polymer composition can vary from 0 to as much as 10 parts by weight based upon the total polymer composition.

The various components of the sealant layer can be mixed together using any convenient rubber mixing equipment, such as a Banbury mixer. This rubber composition used in the sealant layer has sufficient viscosity and unvulcanized adhesion to enable its incorporation into an unvulcanized tire without departing from standard, long standing tire building techniques and without the use of complicated, expensive tire building equipment.

In the method of this invention, the polymer composition can be formed into a strip of unvulcanized rubber that is assembled into the tire. In building the tires of this invention an innerliner is first applied to a building drum and then this strip of butyl polymer composition is applied to the layer of innerliner. After this strip of polymer composition (sealant layer) is assembled into the unvulcanized tire other normal tire components are assembled into the tire using standard, known procedures. It is generally preferred for this polymer composition layer to be assembled into the unvulcanized tire between two innerliner layers (which can be air barrier layers). However, the polymer composition layer can also be assembled into an unvulcanized tire between an innerliner layer and the tires carcass. In other words, the polymer composition layer can be sandwiched between two layers of innerliner or between a layer of innerliner and the carcass.

The strip of unvulcanized butyl rubber composition employed in the polymer composition layer should extend from one shoulder of the tire to the other, in other words, it should cover the crown area of the tire. The thickness of the polymer composition layer can vary greatly in an unvulcanized puncture sealant tire. Generally, the thickness of the polymer composition layer will range from about 0.127cm (0.05 inches) to about 0.635cm (0.25 inches). It is generally preferred for the polymer composition layer to have a thickness of 0.254cm (0.1 inches) to 0.318cm (0.15 inches). In passenger tires it is normally most preferred for the polymer composition layer to have a thickness of about 0.318cm (0.125 inches).

After the unvulcanized pneumatic rubber tires of this invention are assembled they are vulcanized using a normal tire cure cycle. The tires of this invention can be cured over a wide temperature range. However, it is generally preferred for the tires of this invention to be cured at a temperature ranging from about 132° C. (270° F.) to about 166° C. (330° F.). It is more preferred for the tires of this invention to be cured at a temperature ranging from a 143° C. (290° F.) to 154° C. (310° F.). It is generally preferable for the cure cycle used to vulcanize the tires of this invention to have a duration of about 10 to 14 minutes with a cure cycle of about 12 minutes being most preferred.

The present invention is further illustrated by the accompanying drawings. These drawings represent two preferred embodiments of the present invention wherein.

Figure 1:
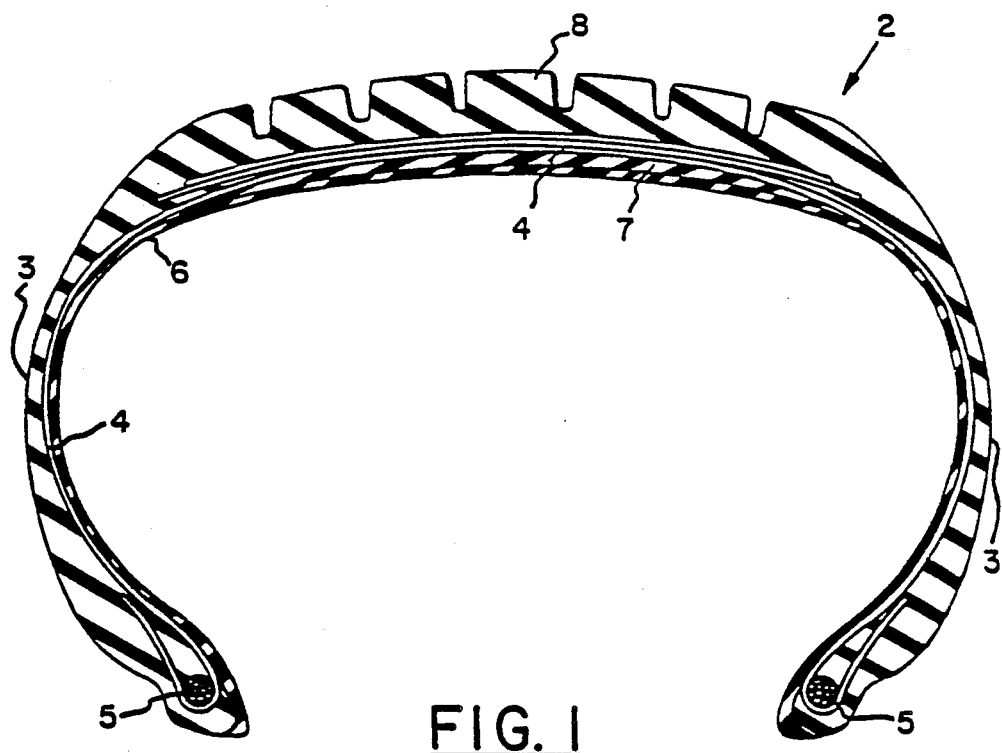
FIG. 1 is a cross-sectional view of a tire of this invention wherein the sealant layer is sandwiched between the innerliner and carcass of the tire.

In FIG. 1 a self-sealing pneumatic rubber tire of this invention is shown generally as 2, wherein the tire has sidewalls 3, a supporting carcass 4, inextensible beads 5, an innerliner (air barrier layer) 6, a sealant layer 7, and an outer circumferential tread (tread portion) 8. The individual sidewalls 3 extend radially inward from the axial outer edges of the tread portion 8 to join the respective inextensible beads 5. The supporting carcass 4 acts as a supporting structure for the tread portion 8 and sidewalls 3. Sealant layer 7 is disposed inwardly from said supporting carcass 4 and outwardly from said innerliner 6. The outer circumferential tread 8 is adapted to be ground contacting when the tire is in use. The innerliner 6 is disposed inwardly from said supporting carcass 4.

Figure 2:
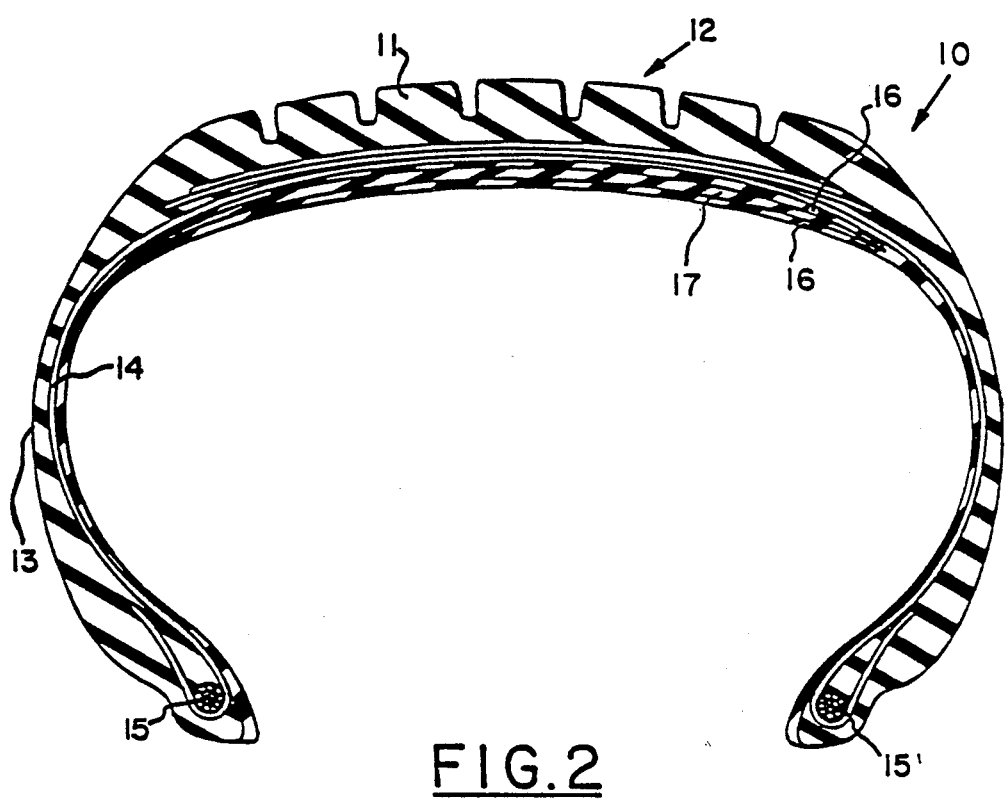
FIG. 2 is a cross-sectional view of a pneumatic rubber tire of this invention wherein the self-sealant layer of the tire is located between two layers of innerliner in the tire.

In FIG. 2 a self-sealant pneumati rubber tire 10 is depicted showing its tread portion 11, crown area 12, sidewalls 13, supporting carcass 14, inextensible beads 15, innerliner 16, and sealant layer 17. In this embodiment of the present invention sealant layer 17 is sandwiched between two layers of innerliner 16. Thus, sealant layer 17 is disposed inwardly from one layer of innerliner and outwardly from another layer of innerliner. Both layers of innerliner 16 and the sealant layer 17 are disposed inwardly from the supporting carcass 14.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

Example 1

A tubeless pneumatic steel belted rubber tire of the HR78–15 type was prepared by first applying a standard rubber innerliner layer to a standard building drum. Then a layer of butyl rubber about 0.11 inches (0.28cm.) thick was applied to the innerliner layer on the building drum as the polymer composition layer (sealant layer). This polymer composition layer (the sealant layer) was composed of the following components which were mixed on a Banbury mixer: 100 parts of a butyl rubber which was a copolymer of isobutylene and isoprene, 25 parts of carbon black, 10 parts of polyisobutylene, 10 parts of caster oil, 0.25 parts of sulfur, and 3.2 parts of 40% dicumylperoxide on an inert silicon oil carrier. Another layer of rubber innerliner was then applied to this butyl rubber layer so as to sandwich the sealant layer between two layers of innerliner. The innerliner layers employed were a blend of natural rubber and styrene-butadiene rubber.

The tread portion, side-walls, beads, and supporting carcass were then assembled into the tire using conventional techniques utilized in the manufacture of steel belted radial tires. This self-sealing tire was cured employing a standard technique at 300° F. (149° C.) for 12 minutes. The tire produced had a structure which generally corresponded to FIG. 2.

Example 2

The self-sealing tubeless pneumatic rubber tire prepared according to Example 1 was tested according to the following method along with a control tire of a similar construction without the puncture sealant layer. The tire was mounted on a rim and inflated. After inflation the sealant layer had a thickness of about 0.23cm (0.09 inches). This tire was then mounted as the left front of an automobile with the control tire being mounted on the right rear. Under this test the tires were run for 17.7km (11 miles) at 113km/hour (70 miles per hour) for conditioning purposes and then punctured with a ten-penny nail having a diameter of 0.36cm (0.142 inches). The nail was driven into and through a major tread groove in the tire. The tires were then rerun at about 113km per hour with the air pressures of the tires being taken periodically and recorded as shown in Table I.

TABLE I

| Miles | Control Tire Pressure | | Self-sealing Tire Pressure | |
|---|---|---|---|---|
| | pascals | psi | pascals | psi |
| 0 | 234,000 | 34 | 228,000 | 33 |
| 11* | 221,000 | 32 | 255,000 | 37 |
| 16 | 207,000 | 30 | 255,000 | 37 |
| 21 | 193,000 | 28 | 255,000 | 37 |
| 26 | 186,000 | 27 | 255,000 | 37 |
| 31 | 172,000 | 25 | 255,000 | 37 |
| 36 | 158,000 | 23 | 255,000 | 37 |
| 41 | 152,000 | 22 | 255,000 | 37 |
| 46 | 152,000 | 22 | 255,000 | 37 |
| 51 | 138,000 | 20 | 255,000 | 37 |
| 56 | 138,000 | 20 | 255,000 | 37 |
| 61 | 124,000 | 18 | 255,000 | 37 |
| 68 | 110,000 | 16 | 255,000 | 37 |

*The self-sealing tire was punctured at this point.

After being run for 92km (57 miles), after being punctured with the nail (109 total kilometers) the air pressure in the control tire was down to $1.10 \times 10^5$ pascals (16psi). At this time the control tire was considered to have failed and was replaced with a new tire. In this same time period the self-sealing tire of this invention did not lose any air pressure with its pressure remaining at $2.55 \times 10^5$ pascals (37psi).

It should be noted that this was a particularly severe test since the nails were allowed to remain in the tires throughout the test. Typically, a tire fails sooner when a nail is allowed to remain in it since the nail generally works (vibrates and wiggles) as the tire is run which enlarges the size of the hole.

After the control tire was replaced the self-sealing tire was run for 140 more km (87 miles), for a total of 232km (144 miles) after being punctured with the nail. The air pressure in the self-sealing tire remained at $2.55 \times 10^5$ pascals (37psi) after this additional 140km (87 mile) run.

The next day the air pressure in the self-sealing tire, which had cooled down overnight, was $2.21 \times 10^5$ pascals (32psi). The tire was then run for an additional 344km (214 miles) with the air pressure of the tire ranging from $2.34 \times 10^5$ pascals (34psi) to $2.41 \times 10^5$ pascals (34psi) during this run.

The following day the air pressure of the tire, which had cooled down over night, was $2.07 \times 10^5$ pascals) 35psi. The air pressure of the tire was again taken periodically throughout this run. Table II shows the air pressure of the self-sealing tire at various mileages from the point when the tire was punctured with the nail.

TABLE II

| | Air Pressure | |
|---|---|---|
| Miles | pascals | psi |
| 358 | 207,000 | 30 |
| 408 | 227,000 | 33 |
| 433 | 227,000 | 33 |
| 453 | 221,000 | 32 |
| 473 | 214,000 | 31 |
| 490 | 186,000 | 27 |
| 500 | 158,000 | 23 |
| 520 | 148,000 | 21 |
| 540 | 124,000 | 18 |
| 560 | 117,000 | 17 |
| 571 | 103,000 | 15 |

This tire was considered to have failed 920km (571 miles) after being punctures with the nail at an air pressure of $1.10 \times 10^5$ pascals (15psi). Thus, the self-sealing tire of this invention went 827km (514 miles) further than did the control tire before failure. After being punctured with the nail the self-sealing tire of this invention went over 10 times as many miles as did the control tire before failure.

What is claimed is:

1. A method of preparing a pneumatic rubber tire having a puncture sealing feature which comprises:
   (a) building an unvulcanized tire comprised of a circumferential rubber tread, a supporting carcass therefor, two spaced beads, two rubber sidewalls connecting said beads, an inner liner and a layer of polymer composition disposed inwardly from said supporting carcass and outwardly from said inner liner wherein said polymer composition consists of based on its polymer content, 100 parts by weight butyl rubber having a number average molecular weight of 200,000 to 500,000, and a Mooney vicosity ranging from about 40 to 58, about 10 to 40 parts by weight of carbon black, about 5 to 35 parts by weight of polyisobutylene having a number average molecular weight of about 7,500 to 15,000, about 5 to 35 parts by weight of an oil extender, about 0 to 1 parts by weight sulfur, and about 1.0 to 8 parts by weight of a perioxide vulcanizing agent; and
   (b) shaping and vulcanizing said tire under conditions of heat and pressure and simultaneously forming in situ a puncture sealant layer in said tire by both crosslinking and partially depolymerizing said butyl rubber in said polymer composition.

2. A method as specified in claim 1 wherein said perioxide vulcanizing agent is selected from the group consisting of: 2,5-bis(t-butyl peroxy)-2,5-dimethyl hexane; 1,1-di-t-butyl perioxi-3,3,5trimethyl cyclohexane; 2,5-dimethyl-2,5di(t-butyl peroxy) hexyne-3; p-chlorobenzyl peroxide; 2,4- dichlorobenzyl peroxide; 2,2, -bis (t-butyl peroxi)-butane; di-ti-butyl perioxide, benzyl peroxide; dicumyl peroxide; and 2,5-dimethyl-2,5di(t-butyl perioxy) hexane.

3. A method as specified in claim 1 wherein said polymer composition layer is comprised of about 100 parts by weight of a butyl rubber copolymer, about 20 to 30 parts by weight of carbon black, about 8 to 12 parts by weight of polyisobuytlene, about 8 to 12 parts by weight of an oil extender, about 0 to 1 parts by weight sulfur, and about 1.0 to 8 parts by weight of a perioxide vulcanizing agent.

4. A method as specified in claim 3 wherein said butyl rubber has a number average molecular weight of 300,000 to 400,000.

5. A method as specified in claim 4 wherein said peroxide vulcanizing agent is dicumylperoxide.

6. A method as specified in claim 5 further comprising a second innerliner which is assembled into said unvulcanized rubber tire inwardly from said supporting carcass and outwardly from said polymer composition layer.

7. A method as specified in claim 6 wherein said rubber tire is shaped and cured at a temperature ranging from about 132° C. (270° F.) to about 166° C. (330° F.).

* * * * *